(12) United States Patent
Laine et al.

(10) Patent No.: US 10,904,225 B2
(45) Date of Patent: Jan. 26, 2021

(54) COMPUTING A PRIVATE SET INTERSECTION

(71) Applicant: Microsoft Technology Licensing, LLC, Redmond, WA (US)

(72) Inventors: Kim Laine, Redmond, WA (US); Hao Chen, Redmond, WA (US); Peter Byerley Rindal, Walla Walla, WA (US); Zhicong Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 16/008,915

(22) Filed: Jun. 14, 2018

(65) Prior Publication Data
US 2019/0342270 A1    Nov. 7, 2019

Related U.S. Application Data

(60) Provisional application No. 62/667,988, filed on May 7, 2018.

(51) Int. Cl.
*H04L 29/06*    (2006.01)
*H04L 9/00*    (2006.01)
(Continued)

(52) U.S. Cl.
CPC ........ *H04L 63/0428* (2013.01); *G06F 16/134* (2019.01); *G06F 16/152* (2019.01);
(Continued)

(58) Field of Classification Search
CPC ..... H04L 9/008; H04L 9/0618; H04L 9/0861; H04L 9/14; H04L 9/30; H04L 63/0428;
(Continued)

(56) References Cited

U.S. PATENT DOCUMENTS

2006/0245587 A1* 11/2006 Pinkas ............... H04L 9/085
  380/28
2017/0149796 A1*  5/2017 Gvili ................ H04L 9/085
2018/0323966 A1* 11/2018 Kanagaraj ........... G06F 21/602

OTHER PUBLICATIONS

Chen, et al., "Fast Private Set Intersection from Homomorphic Encryption", In Proceedings of the 2017 Conference on Computer and Communications Security, Apr. 3, 2017, 19 Pages. (Year: 2017).*

(Continued)

*Primary Examiner* — Daniel B Potratz
*Assistant Examiner* — Wansik You
(74) *Attorney, Agent, or Firm* — Schwegman Lundberg & Woessner, P.A.

(57) ABSTRACT

Systems and methods for computing a private set intersection are disclosed. A method includes storing, at a sender device, a first set of values. The method includes receiving, from a receiver device, a homomorphic encryption of a receiver device value. The method includes computing a homomorphically encrypted number based on a difference between the homomorphic encryption of the receiver device value and each value in the first set of values, and based on a hash function of the encryption of the receiver device value. The method includes transmitting the homomorphically encrypted number to the receiver device for determination, at the receiver device, whether the receiver device value is in the first set of values.

25 Claims, 9 Drawing Sheets

(51) Int. Cl.
*G06F 16/901* (2019.01)
*G06F 16/22* (2019.01)
*G06F 16/31* (2019.01)
*H04L 9/14* (2006.01)
*G06F 21/60* (2013.01)
*H04L 9/06* (2006.01)
*H04L 9/32* (2006.01)
*G06F 16/14* (2019.01)
*G06F 16/13* (2019.01)

(52) U.S. Cl.
CPC ........ *G06F 16/2255* (2019.01); *G06F 16/325* (2019.01); *G06F 16/9014* (2019.01); *G06F 21/602* (2013.01); *H04L 9/008* (2013.01); *H04L 9/0643* (2013.01); *H04L 9/14* (2013.01); *H04L 9/3236* (2013.01); *H04L 9/3239* (2013.01); *H04L 9/3242* (2013.01)

(58) Field of Classification Search
CPC . H04L 2209/46; H04L 9/3236; H04L 9/0643; H04L 9/3239; H04L 9/3242; H04L 9/06; G06F 16/2255; G06F 16/325; G06F 16/9014; G06F 16/152; G06F 16/134
See application file for complete search history.

(56) References Cited

OTHER PUBLICATIONS

Jarecki, et al., "Efficient Oblivious Pseudorandom Function with Applications to Adaptive OT and Secure Computation of Set Intersection", 6th Theory of Cryptography Conference, TCC 2009, Mar. 15-17, 2009, pp. 577-594 (Year: 2009).*

Brakerski, et al., "(Leveled) Fully Homomorphic Encryption without Bootstrapping", In Proceedings of ACM Transactions on Computation Theory, vol. 6, Issue 3, Jul. 1, 2014, 36 Pages.

Chen, et al., "Fast Private Set intersection from Homomorphic Encryption",In Proceedings of the 2017 Conference on Computer and Communications Security, Apr. 3, 2017, 19 Pages.

Chen, et al., "Labeled PSI from Fully Homomorphic Encryption with Malicious Security", In Proceedings of the ACM SIGSAC Conference on Computer and Communications Security, Oct. 15, 2018, pp. 1223-1237.

"International Search Report and Written Opinion Issued in PCT Patent Application No. PCT/US2019/029522", dated Jul. 10, 2019, 12 Pages.

Chen, et al., "Private Set Intersection Encryption Techniques", Application as Filed in U.S. Appl. No. 15/624,469, filed Jun. 15, 2017, 50 Pages.

Chen, et al., "Fast private set intersection from homomorphic encryption", In Proceedings of ACM Conference on Computer and Communications Security, Oct. 30, 2017, pp. 1243-1255.

* cited by examiner

COMPUTING A PRIVATE SET INTERSECTION

PRIORITY CLAIM

This application claims priority to U.S. Provisional Patent Application No. 62/667,988, filed May 7, 2018 and titled "COMPUTING A PRIVATE SET INTERSECTION," the disclosure of which is expressly incorporated herein by reference in its entirety.

BACKGROUND

Computing an intersection of a first set held at a first computing device (e.g. a client device) and a second set held at a second computing device (e.g. a server), without either computing device revealing values in its set, may be desirable. For example, when a user downloads an instant messaging application to a mobile device, it may be desirable to determine an intersection of the user's contact set (stored at the mobile device) and a set of members of the instant messaging application (stored at an instant messaging server). However, the user may not desire to provide his/her contact set to the instant messaging server or an intermediary. Also, the instant messaging application may not desire (e.g. based on legal requirements or best practices) to transmit its set of members to the mobile device or an intermediary. As the foregoing illustrates, techniques for privately computing an intersection of two sets may be desirable.

BRIEF DESCRIPTION OF THE DRAWINGS

Some embodiments of the technology are illustrated, by way of example and not limitation, in the figures of the accompanying drawings.

SUMMARY

Figure 1:
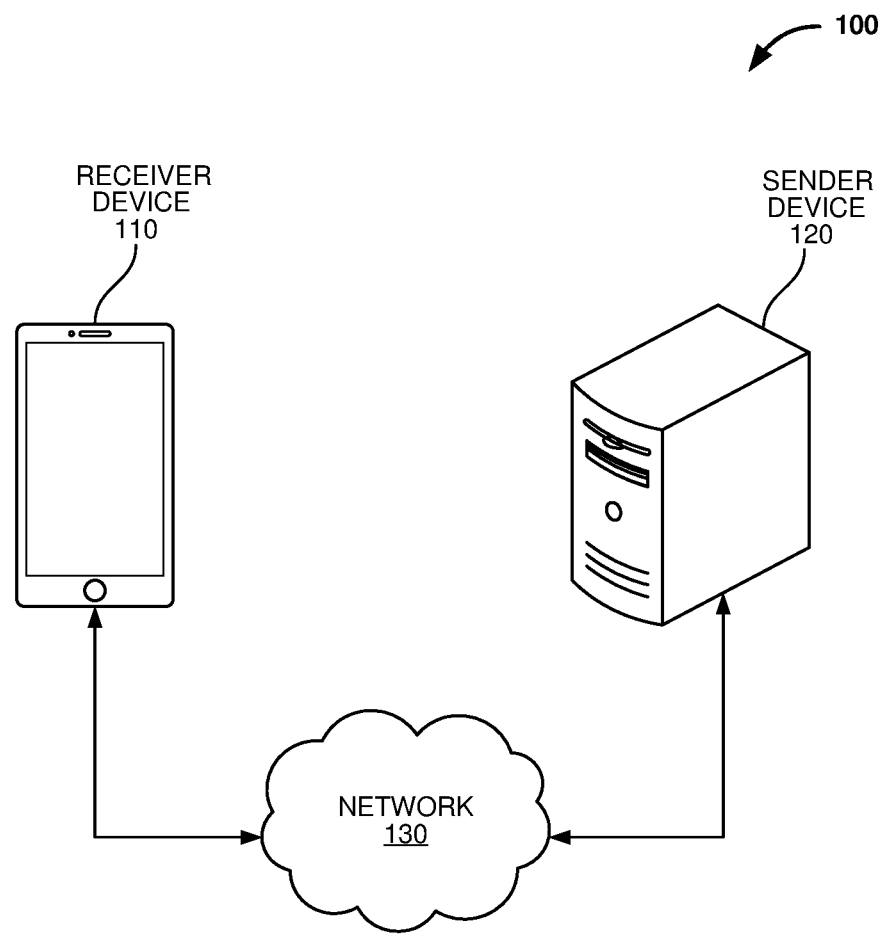
FIG. 1 illustrates an example system in which a private set intersection may be computed, in accordance with some embodiments.

The present disclosure generally relates to machines configured to compute a private set intersection, including computerized variants of such special-purpose machines and improvements to such variants, and to the technologies by which such special-purpose machines become improved compared to other special-purpose machines that provide technology for neural networks. In particular, the present disclosure addresses systems and methods for computing a private set intersection.

According to some aspects of the technology described herein, a system includes processing hardware of a sender device. The system includes a memory of the sender device, the memory storing instructions which, upon execution by the processing hardware, cause the processing hardware to perform operations. The operations include storing, in the memory of the sender device, a first set of values. The operations include receiving, from a receiver device, a homomorphic encryption of a receiver device value. The operations include computing a homomorphically encrypted number based on a difference between the homomorphic encryption of the receiver device value and each value in the first set of values, and based on a payload function of the encryption of the receiver device value. The operations include transmitting the homomorphically encrypted number to the receiver device for determination, at the receiver device, whether the receiver device value is in the first set of values.

According to some aspects, a method is implemented at a receiver device. The method includes computing a homomorphic encryption of a receiver device value stored at the receiver device. The method includes transmitting, to a sender device, the homomorphic encryption of the receiver device value. The method includes receiving, from the sender device, a homomorphically encrypted number in response to the homomorphic encryption of the receiver device value. The method includes decrypting the homomorphically encrypted number to compute a decrypted number. The method includes determining whether the receiver device value is in a first set of values stored at the sender device based on whether the decrypted number is equal to a payload function of the receiver device value.

According to some aspects, a machine-readable medium stores instructions which, upon execution by a sender device, cause the sender device to perform operations. The operations include storing, at the sender device, a first set of values. The operations include computing, at the sender device, a sender hash table for the first set of values. The operations include receiving, from a receiver device, a homomorphic encryption of a receiver hash table for a second set of values, the receiver hash table lacking hash collisions, and the second set of values being stored at the receiver device. The operations include batching the homomorphic encryption of the receiver hash table and the sender hash table into a plurality of batches. The operations include splitting each batch of the plurality of batches of the sender hash table into a plurality of splits. The operations include, for each split of the sender hash table, for each non-empty row in a corresponding batch of the homomorphic encryption of the receiver hash table, computing a homomorphically encrypted number representing whether an unencrypted value in the non-empty row of the receiver hash table is stored in a corresponding row of the split; and transmitting the homomorphically encrypted number to the receiver device for determination, at the receiver device, whether the unencrypted value in the non-empty row of the receiver hash table is stored in the corresponding row of the split.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, techniques for computing a private set intersection (PSI)—privately computing an intersection of two sets (that are stored at two different devices)—may be desirable. Some aspects of the technology described herein are directed to technical solutions to the technical problem of computing a private set intersection.

Some implementations of the solution to this problem involve a sender device, which stores a set of sender values, and a receiver device (that stores a receiver value and receives an indication of whether the receiver value is stored at the sender device). If the receiver device stores multiple receiver values, the solution described below may be repeated multiple times (e.g. once for each value). The receiver device homomorphically encrypts the receiver value, and sends the homomorphically encrypted value to the sender device. The sender device makes a computation with the homomorphically encrypted value and sends back an encrypted number. The receiver device decrypts the encrypted number, and uses the decrypted number to determine whether the receiver value is in the set of sender values. This technique is described in more detail below, for example, in conjunction with FIG. 2.

As used herein, the phrase "homomorphic encryption" encompasses its plain and ordinary meaning. In some examples, homomorphic encryption is a form of encryption that allows computation on ciphertexts, generating an encrypted result which, when decrypted, matches the result of the operations as if they had been performed on the plaintext. The purpose of homomorphic encryption is to allow computation on encrypted data. For example, if Enc is a homomorphic encryption function and $A=B+C*D$, then $Enc(A)=Enc(B)+Enc(C)*Enc(D)$.

FIG. 1 illustrates an example system 100 in which a private set intersection may be computed, in accordance with some embodiments. As shown, the system 100 includes a receiver device 110 and a sender device 120 connected to one another via a network 130. The network 130 may include one or more of the internet, an intranet, a local area network (LAN), a wide area network (WAN), a wired network, a wireless network, and the like. In some examples, the receiver device 110 may be a client device (e.g. a mobile phone), and the sender device 120 may be a server. In one example, the receiver device 110 downloads an instant messaging application associated with the sender device 120 and wants to determine which members of its contact set are members of the instant messaging application. However, the sender device 120 does not wish to share the set of members of the instant messaging application, and the receiver device 110 does not wish to share its contact set.

The technology described herein may be implemented with any number of members of the contact set of the receiver device 110 and any number of members of the instant messaging application of the sender device 120. However, in some examples, the number of members of the contact set of the receiver device 110 is between 50 and 1000, and the number of members of the instant messaging application of the sender device 120 is in the thousands or millions.

Figure 2:
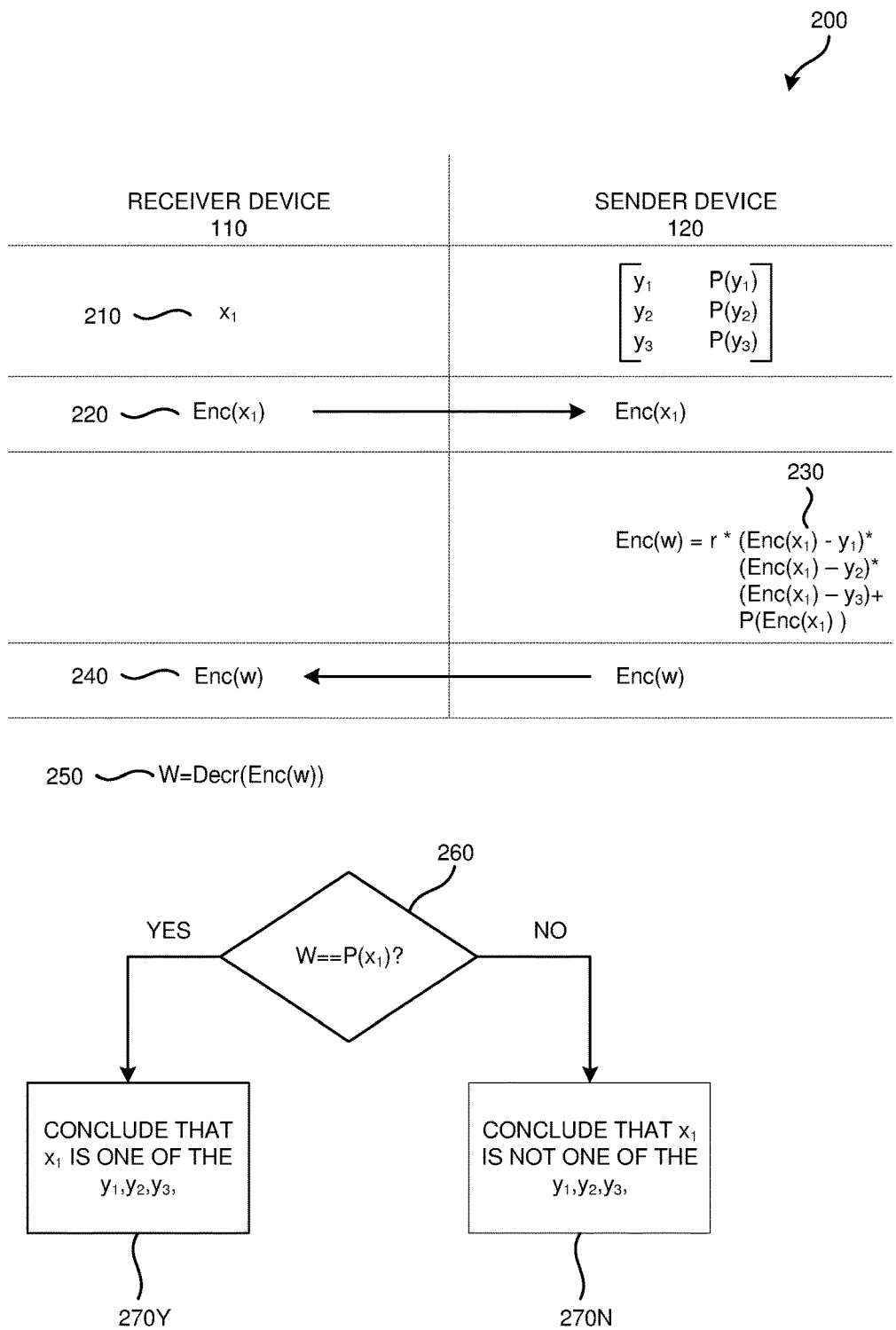
FIG. 2 is a data flow diagram of an example method for determining whether a value from a receiver device is in a set of a sender device, in accordance with some embodiments.

FIG. 2 is a data flow diagram of an example method 200 for determining whether a value from the receiver device 110 is in a set of the sender device 120, in accordance with some embodiments. The method 200 is used for the receiver device 110 to determine whether a single value $x_1$, that is stored at the receiver device 110, is also stored at the sender device 120. If the receiver device 110 stores multiple values, the method 200 may be implemented multiple times (e.g. once for each value). In some cases, all of the computations in the method 200 are done modulo a large prime T. The prime T is greater than a predetermined threshold number.

At operation 210, the receiver device 110 stores the value $x_1$, and the sender device 120 stores $y_1$, $y_2$, and $y_3$, and their payload functions $P(y_1)$, $P(y_2)$, and $P(y_3)$. As used herein, the payload function P may include any function that can be any function that maps one value to another value. $P(y_1)$, $P(y_2)$, and $P(y_3)$ may be referred to as the payload(s) of $y_1$, $y_2$, and $y_3$, respectively. The payload function P may be an oblivious pseudorandom function (OPRF) that is stored at the sender device 120 and obliviously accessible to the receiver device 110. In other words, the receiver device 110 can access the payload function P to make calculations, but cannot determine the coefficients of the payload function. Also, while the sender device 120 is described here as storing three values—$y_1$, $y_2$, and $y_3$—the sender device 120 may store any number of values. In some cases, the sender device 120 stores thousands or millions of values.

As used herein, the phrase "oblivious pseudorandom function (OPRF)" encompasses its plain and ordinary meaning. In some cases, the receiver device 110 gives the input for a pseudorandom function (PRF) to the sender device 120, and the sender device 120 computes the PRF and gives the output to the receiver device 110. The sender device 120 is not able to see either the input or the output, and the receiver device 110 is not able to see the secret key that the sender device 120 uses with the pseudorandom function. This enables transactions of sensitive cryptographic information to be secure even between untrusted parties, such as the receiver device 110 and the sender device 120.

At operation 220, the receiver device 110 computes a homomorphic encryption of $x_1$, $Enc(x_1)$, and transmits $Enc(x_1)$ to the sender device 120. The sender device 120 receives $Enc(x_1)$. The homomorphic encryption function Enc and its inverse Decr are accessible to the receiver device 110. However, the homomorphic encryption function Enc and its inverse Decr are not accessible to the sender device 120.

At operation 230, the sender device 120 computes an encrypted number Enc(w), using Equation 1, below.

$$Enc(w)=r*(Enc(x_1)-y_1)*(Enc(x_1)-y_2)*(Enc(x_1)-y_3)+ H(Enc(x_1)) \quad \text{Equation 1}$$

$$Enc(w)=r[Enc(x_1)^3-(y_1+y_2+y_3)Enc(x_1)^2+(y_1y_2+y_1y_3+ y_2y_3)Enc(x_1)-y_1y_2y_3]+H(Enc(x_1)) \quad \text{Equation 1a}$$

In Equation 1, r is a random value that ensures that Enc(w) does not include any private information of the sender device. It should be noted that the polynomial of Equation 1a is equivalent to that of Equation 1. In some cases, the polynomial of Equation 1a may be evaluated in place of that of Equation 1 in order to increase processing speed or calculation speed.

In some examples, the product of differences is $(Enc(x_1)-y_1)*(Enc(x_1)-y_2)*(Enc(x_1)-y_3)$. This is equal to $Enc(x_1)^3-(y_1+y_2+y_3)Enc(x_1)^2+(y_1y_2+y_1y_3+y_2y_3)Enc(x_1)-y_1y_2y_3$. Here the coefficients of the polynomial (in terms of $Enc(x_1)$) are so-called elementary symmetric polynomials in the items of the sender device 120. When the sender device 120 obtains $Enc(x_1)$, it computes the encryptions of $Enc(x_1)^2$ and $Enc(x_1)^3$ also (in encrypted form) and evaluates the polynomial of Equation 1a. The coefficients—$(y_1+y_2+y_3)$, $(y_1y_2+y_1y_3+y_2y_3)$, $y_1y_2y_3$—it has pre-computed and stored in an offline phase so this is very fast. When the sender has a lot of items it's inconvenient to compute $y^2, y^3, \ldots, y^k$ in encrypted form given just an encryption of $y^1$. Therefore we use also a windowing approach, where the receiver gives the sender $y, y^2, y^4, \ldots, y^{\{2^a\}}$ up to a large enough power $2^a$. This makes the sender's task to compute all powers of y much easier. There are also some variants of windowing which make the task even easier. Maybe a detailed description could be avoided in the claims.

It should be noted that, if $x_1$ is one of $y_1$, $y_2$, or $y_3$ (or, in other words, if $x_1$ is stored at the sender device 120), then the conditions of Equation 2 and Equation 3 apply. The reason is that the homomorphic encryption function Enc allows computation on ciphertexts, generating an encrypted result which, when decrypted, matches the result of the operations as if they had been performed on the plaintext.

$$Enc(0)=r^*(Enc(x_1)-y_1)^*(Enc(x_1)-y_2)^*(Enc(x_1)-y_3) \quad \text{Equation 2}$$

$$Enc(w)=H(Enc(x_1))=Enc(H(x_1)) \quad \text{Equation 3}$$

At operation 240, the sender device 120 transmits Enc(w) to the receiver device 110. The receiver device 110 receives Enc(w).

At operation 250, the receiver device decrypts Enc(w) to yield w using w=Decr(Enc(w)).

At operation 260, the receiver device determines whether w is equal to (represented as == in the figure) the payload function of $x_1$, $P(x_1)$. If so, then at operation 270Y, the receiver device 110 concludes that $x_1$ is one of $y_1$, $y_2$, and $y_3$, and is stored at the sender device 120. If not, then at operation 270N, the receiver device 110 concludes that $x_1$ is not one of $y_1$, $y_2$, and $y_3$, and is not stored at the sender device 120.

It should be noted that the technique described herein could be implemented without the $H(Enc(x_1))$ component of Equation 1. (In this case, the receiver device 110 would check whether w is equal to 0 (rather than $H(x_1)$) in operation 260.) However, this component is useful to prevent a malicious sender device 120 from encrypting a zero to cause the receiver device 110 to incorrectly conclude that $x_1$ is stored at the sender device 120.

As discussed above, in some cases, all of the computations in the method 200 are done modulo a large prime T. The prime T is greater than a predetermined threshold number. In some cases, the values calculated in the method 200 (and other methods described herein) may be represented as tuples of numbers modulo T. Each such tuple may be represented as an extension field element. Using such tuples reduces computational costs when working with large numbers (e.g. numbers with more than 80 bits).

Figure 3:
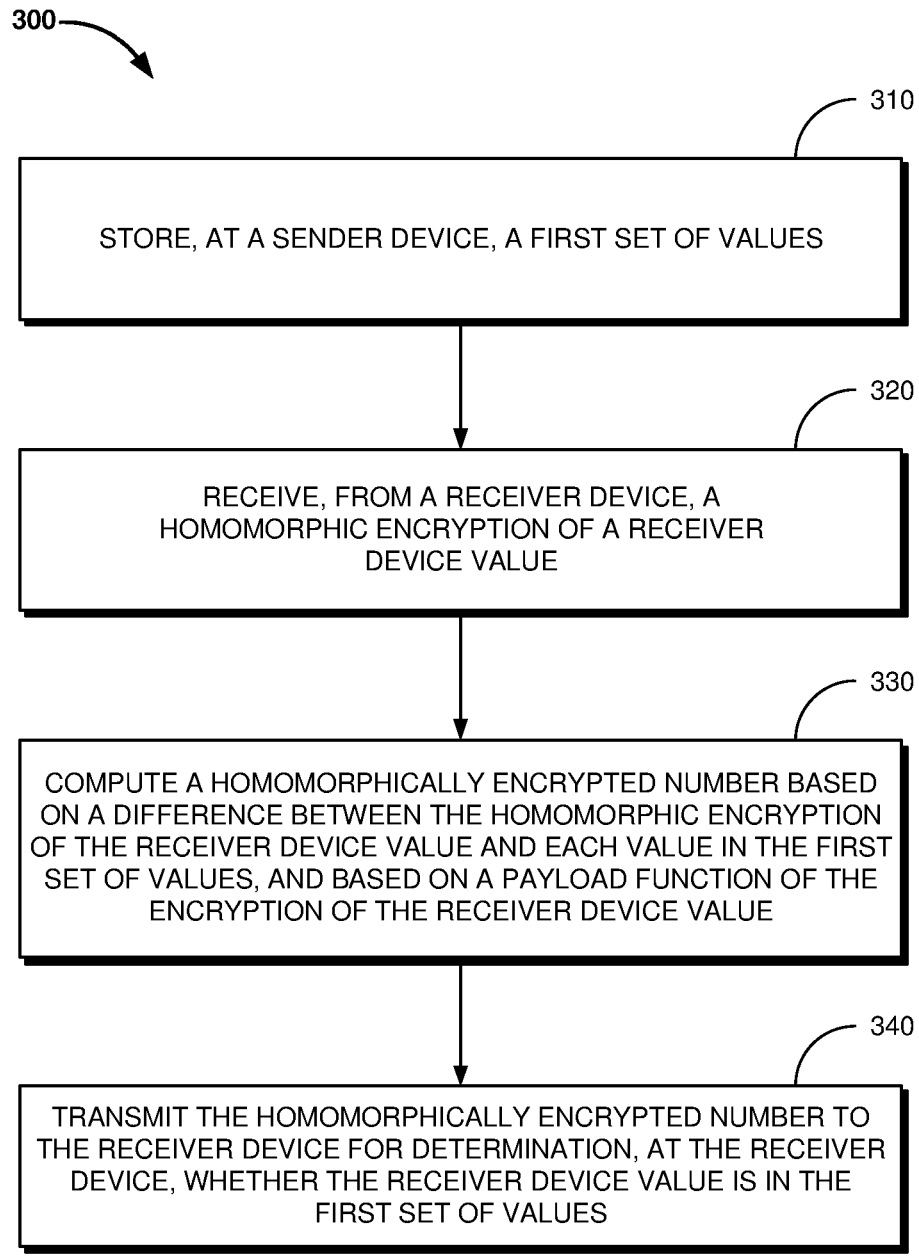
FIG. 3 illustrates a flow chart for an example method for a sender device to facilitate determining whether a value from a receiver device is in a set of a sender device, in accordance with some embodiments.

FIG. 3 illustrates a flow chart for an example method 300 for the sender device 120 to facilitate determining whether the value from the receiver device 110 is in the set of the sender device 120, in accordance with some embodiments.

At operation 310, the sender device 120 stores a first set of values (e.g. $y_1$, $y_2$, and $y_3$). The first set of values may include any number of values, not necessarily three values.

At operation 320, the sender device 120 receives, from the receiver device 110, a homomorphic encryption of a receiver device value (e.g. $Enc(x_1)$).

At operation 330, the sender device 120 computes a homomorphically encrypted number (e.g. Enc(w)) based on a difference between the homomorphic encryption of the receiver device value and each value in the first set of values (e.g. $(Enc(x_1)-y_1)$, $(Enc(x_1)-y_2)$, $(Enc(x_1)-y_3)$), and based on a payload function of the encryption of the receiver device value (e.g. $P(Enc(x_1))$). In some cases, the sender device 120 computes a set of differences (e.g. $(Enc(x_1)-y_1)$, $(Enc(x_1)-y_2)$, $(Enc(x_1)-y_3)$). the set of differences includes the difference between the homomorphic encryption of the receiver device value and each value in the first set of values. The sender device 120 computes a product of members of the set of differences (e.g. $(Enc(x_1)-y_1)^*(Enc(x_1)-y_2)^*(Enc(x_1)-y_3)$). The sender device 120 multiplies the product of the members of the set of differences by a random number (e.g. r) to compute a first number (e.g. $r^*(Enc(x_1)-y_1)^*(Enc(x_1)-y_2)^*(Enc(x_1)-y_3)$). The sender device 120 adds the first number to the payload function of the encryption of the receiver device value (e.g. $P(Enc(x_1))$) to compute the homomorphically encrypted number.

At operation 340, the sender device 120 transmits the homomorphically encrypted number to the receiver device 110 for determination, at the receiver device 110, whether the receiver device value is in the first set of values. The receiver device 110 may decrypt the homomorphically encrypted number to compute a decrypted number (e.g. w). The receiver device 110 may determine whether the receiver device value is in the first set of values based on whether the decrypted number is equal to the payload function of the receiver device value (e.g., $P(x_1)$), when the receiver device value (e.g. $x_1$) is not encrypted. In some cases, the sender device 120 transmits, to the receiver device 110, a payload of the homomorphically encrypted number together with the homomorphically encrypted number.

In some cases, it might not be possible for the receiver device 110 to determine if the decrypted value it receives is the real label. In other cases, this is possible, for example when the label is a hash of the item value to obtain security against a malicious sender, since the receiver device 110 knows what that label should be. This can be used together with the techniques described herein for returning encrypted labels. In other cases, where some actual data is returned in addition to the TRUE/FALSE value (whether there was intersection), some aspects may return the encrypted evaluation of the product of differences polynomial (TRUE/FALSE value of intersection) in addition to the evaluation of the label interpolation polynomial that gives the label when evaluated at the correct value by the sender device 120.

Figure 4:
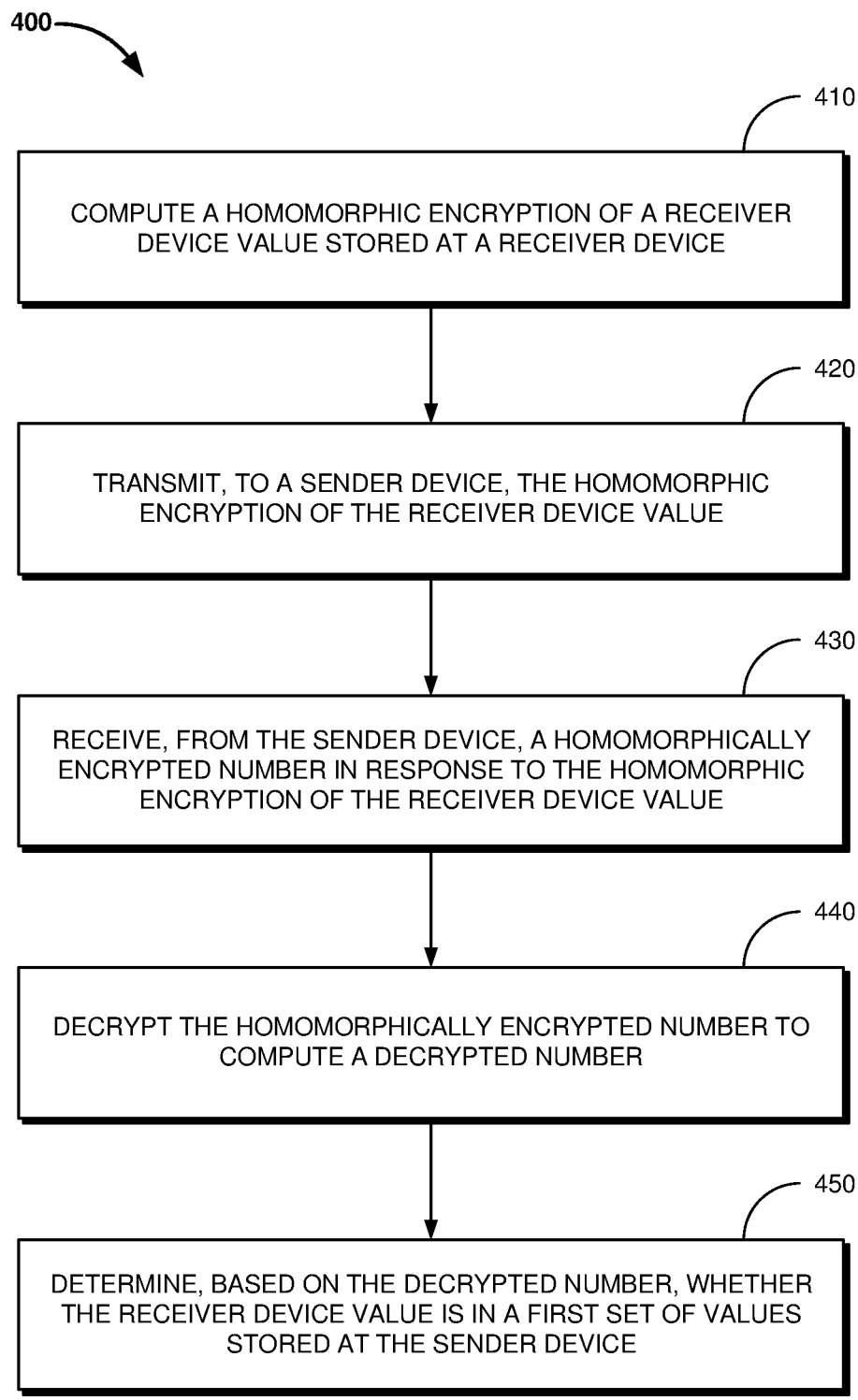
FIG. 4 illustrates a flow chart for an example method for a receiver device to facilitate determining whether a value from a receiver device is in a set of a sender device, in accordance with some embodiments.

FIG. 4 illustrates a flow chart for an example method 400 for the receiver device 110 to facilitate determining whether the value from the receiver device 110 is in the set of the sender device 120, in accordance with some embodiments.

At operation 410, the receiver device 110 computes a homomorphic encryption of a receiver device value (e.g. $x_1$) stored at the receiver device 110.

At operation 420, the receiver device 110 transmits, to the sender device 120, the homomorphic encryption (e.g. $Enc(x_1)$) of the receiver device value.

At operation 430, the receiver device 110 receives, from the sender device, a homomorphically encrypted number (e.g. Enc(w)) in response to the homomorphic encryption of the receiver device value. In some cases, the homomorphically encrypted number is computed, at the sender device 120, based on the homomorphic encryption of the receiver device value.

At operation 440, the receiver device 110 decrypts the homomorphically encrypted number to compute a decrypted number (e.g. w).

At operation 450, the receiver device 110 determines, based on the decrypted number, whether the receiver device value is in a first set of values (e.g., $y_1$, $y_2$, and $y_3$) stored at the sender device 120. For example, the receiver device 110 determines whether the receiver device value is in the first set of values stored at the sender device 120 based on whether the decrypted number is equal to a payload function of the receiver device value (e.g. $P(x_1)$).

Figure 5A:
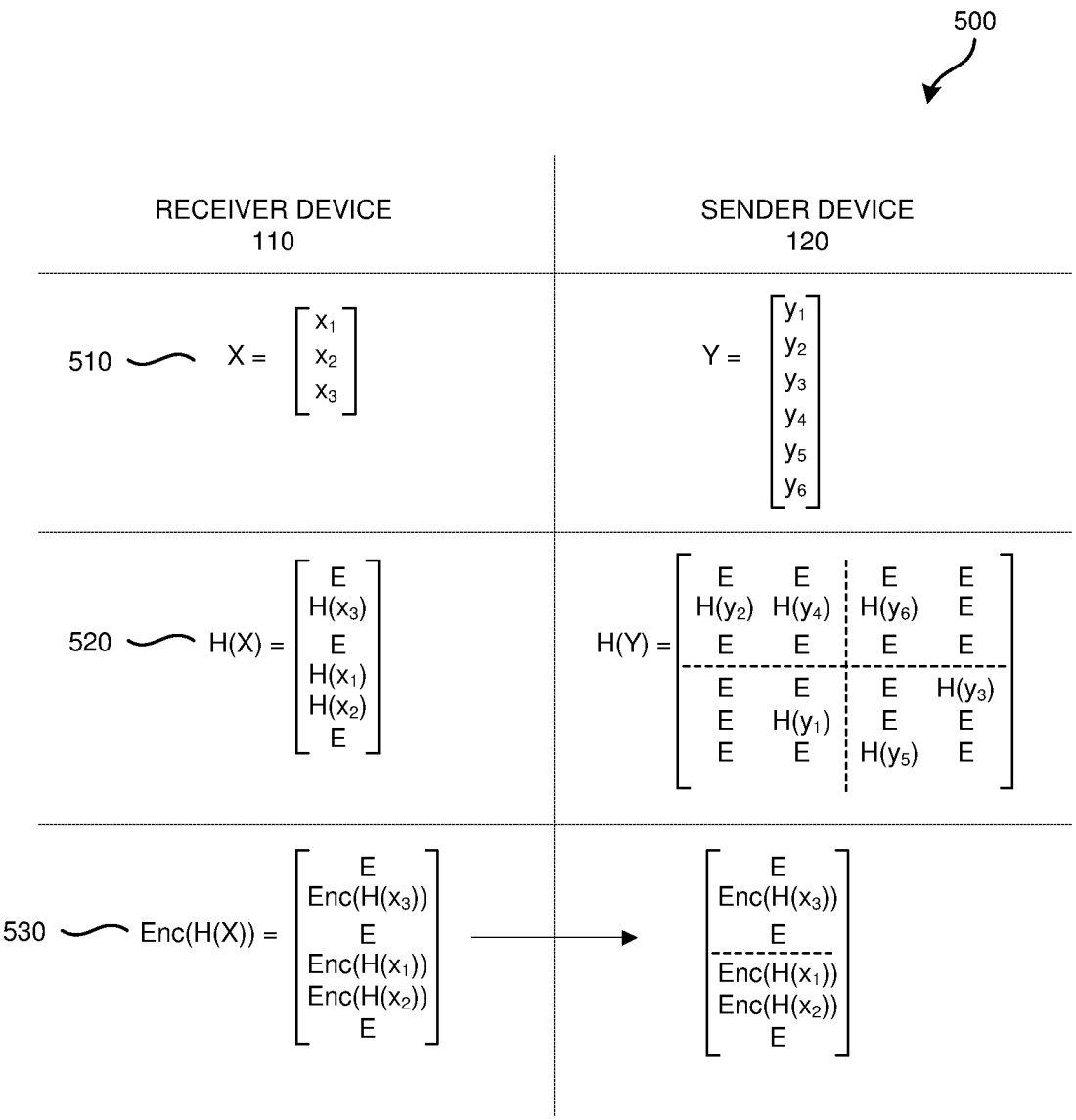
FIGS. 5A-5B are a data flow diagram of an example method for computing a private set intersection, in accordance with some embodiments.
Figure 5B:
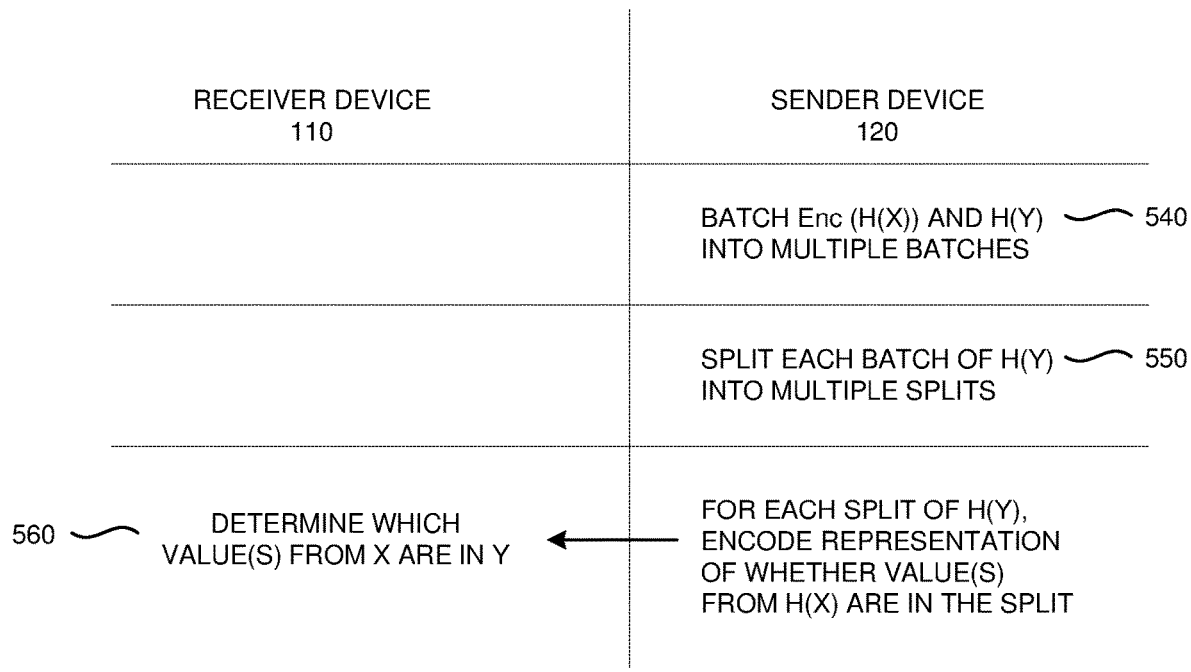

FIGS. 5A-5B are a data flow diagram of an example method 500 for computing a private set intersection, in accordance with some embodiments. The method 500 is implemented using the receiver device 110 and the sender device 120. In some cases, all of the computations described in conjunction with the method 500 (and the other methods described herein) are done modulo a prime number T that is greater than a threshold number.

As shown in FIG. 5A, at operation 510, the sender device 120 stores a first set of values Y, which includes: $y_1$, $y_2$, $y_3$, $y_4$, $y_5$, and $y_6$. The receiver device 110 stores a second set of values X, which includes: $x_1$, $x_2$, and $x_3$. The first set of values Y and the second set of values X may include any number of values, not necessarily 6 values and 3 values, as described here. In some cases, Y includes much more (e.g. thousands of times more) values than X.

At operation 520, the sender device 120 computes a hash table for the first set of values Y. The hash table may be computed using a hash function H. In some examples, H is selected such that there are no hash collisions for the second set of values X. In other words, if $i \neq j$, then $H(x_i) \neq H(x_j)$. However, there may be hash collisions for the first set of values Y, as Y may be much larger than X. In some cases, the hash function H is an OPRF that is stored at the sender device and obliviously accessible to the receiver device. The receiver device 110 computes a hash table for the second set of values X using the hash function H. Table 1 illustrates an example of the values of H(X), and Table 2 illustrates an example of the values of H(Y). Values in the same row (e.g., $y_2$, $y_4$, and $y_6$) have a hash collision, as the row corresponds to the value of the hash function. In Table 1 and Table 2, E indicates an empty value.

TABLE 1

Example H(X) values.

E
$H(x_3)$
E
$H(x_1)$
$H(x_2)$
E

TABLE 2

Example H(Y) values.

| E | E | E | E |
|---|---|---|---|
| $H(y_2)$ | $H(y_4)$ | $H(y_6)$ | E |
| E | E | E | E |
| E | E | E | $H(y_3)$ |
| E | $H(y_1)$ | E | E |
| E | E | $H(y_5)$ | E |

Each row corresponds to a value of the hash function. For example, the second row corresponds to a specific value to a hash function. Thus, $H(x_3)=H(y_2)=H(y_4)=H(y_6)$. As a result, $x_3$ might be equal to $y_2$, $y_4$, or $y_6$. However, $x_3$ is definitely not equal to $y_1$ because $H(x_3) \neq H(y_1)$.

At operation 530, the receiver device 110 computes the homomorphic encryption of H(X), denoted Enc(H(X)). The receiver device 110 transmits Enc(H(X)) to the sender device 120. The sender device 120 receives Enc(H(X)). In some aspects, the homomorphic encryption is computed using a homomorphic encryption function Enc. The homomorphic encryption function is not accessible to the sender device 120. The homomorphic encryption function is accessible to the receiver device 110. Similarly, an inverse of the homomorphic encryption function is not accessible to the sender device 120. The inverse of the homomorphic encryption function is accessible to the receiver device 110. An example of Enc(H(X)) corresponding to Table 1 is illustrated in Table 3. After operation 530, the method 500 continues to FIG. 5B.

TABLE 3

Example Enc(H(X)) values.

E
Enc(H($x_3$))
E
Enc(H($x_1$))
Enc(H($x_2$))
E

As shown in FIG. 5B, at operation 540, the sender device batches Enc(H(X)) and H(Y) into multiple batches. The batches leave the rows intact and each batch is assigned a set of rows. Examples of batches of Enc(H(X)) are shown in Tables 4A and 4B. Examples of batches of H(Y) are shown in Tables 5A and 5B. While two batches are illustrated, any number of batches are possible.

TABLE 4A

Example batch of Enc(H(X)).

E
Enc(H($x_3$))
E

TABLE 4B

Example batch of Enc(H(X)).

Enc(H($x_1$))
Enc(H($x_2$))
E

TABLE 5A

Example batch of H(Y).

| E | E | E | E |
|---|---|---|---|
| $H(y_2)$ | $H(y_4)$ | $H(y_6)$ | E |
| E | E | E | E |

TABLE 5B

Example batch of H(Y).

| E | E | E | $H(y_3)$ |
|---|---|---|---|
| E | $H(y_1)$ | E | E |
| E | E | $H(y_5)$ | E |

At operation 550, the sender device then splits each batch of H(Y) into multiple splits. The splits leave the columns intact and each split is assigned a set of columns. Examples of splits of H(Y) are illustrated in Tables 6A-6D.

TABLE 6A

Example Split of H(Y).

| | |
|---|---|
| E | E |
| H($y_2$) | H($y_4$) |
| E | E |

TABLE 6B

Example Split of H(Y).

| | |
|---|---|
| E | E |
| H($y_6$) | E |
| E | E |

TABLE 6C

Example Split of H(Y).

| | |
|---|---|
| E | E |
| E | H($y_1$) |
| E | E |

TABLE 6D

Example Split of H(Y).

| | |
|---|---|
| E | H($y_3$) |
| E | E |
| H($y_5$) | E |

At operation 560, the sender device 120, for each split of H(Y), encodes a representation of whether value(s) from H(X) are in the split, and transmits the encoded representations to the receiver device 110. The receiver device 110 receives the encoded representations and determines, based on the encoded representations, which value(s) from X are in Y.

In some cases, each split of H(Y) is compared with a corresponding batch of Enc(H(X)). For example, the splits of Tables 6A and 6B are compared to the batch of Table 4A. The splits of Tables 6C and 6D are compared to the batch of Table 4B. In some cases, the sender device 120, for each split of the sender hash table, for each non-empty row in a corresponding batch of the homomorphic encryption of the receiver hash table, computes a homomorphically encrypted number representing whether an unencrypted value in the non-empty row of the receiver hash table is stored in a corresponding row of the split. The sender device 120 transmits the homomorphically encrypted number to the receiver device 110 for determination, at the receiver device 110, whether the unencrypted value in the non-empty row of the receiver hash table is stored in the corresponding row of the split. The homomorphically encrypted number for each row of each split may be computed, for example, using the technique described above in conjunction with FIG. 2.

In some cases, the sender device 120 has multi-threaded processing hardware. Each split of the sender hash table (e.g. each of Tables 6A-6D) is processed using a separate and distinct thread of the multi-threaded processing hardware. As a result, computations for each split may be done in parallel, and the size of the polynomial (of operation 230 in FIG. 2) may be limited by the size of the split.

Figure 6A:
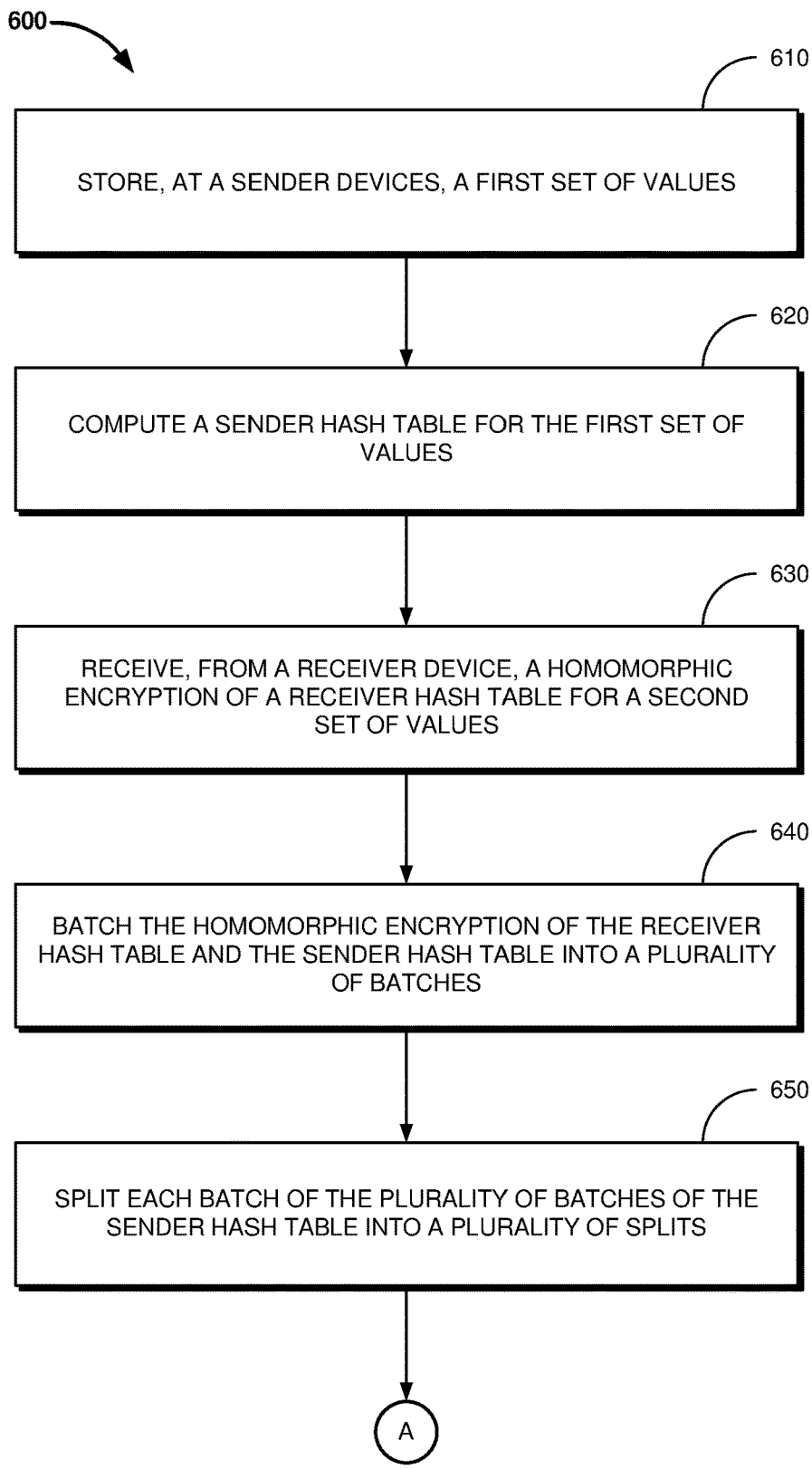
FIGS. 6A-6B are a flow chart of an example method for a sender device to facilitate computing a private set intersection, in accordance with some embodiments.
Figure 6B:
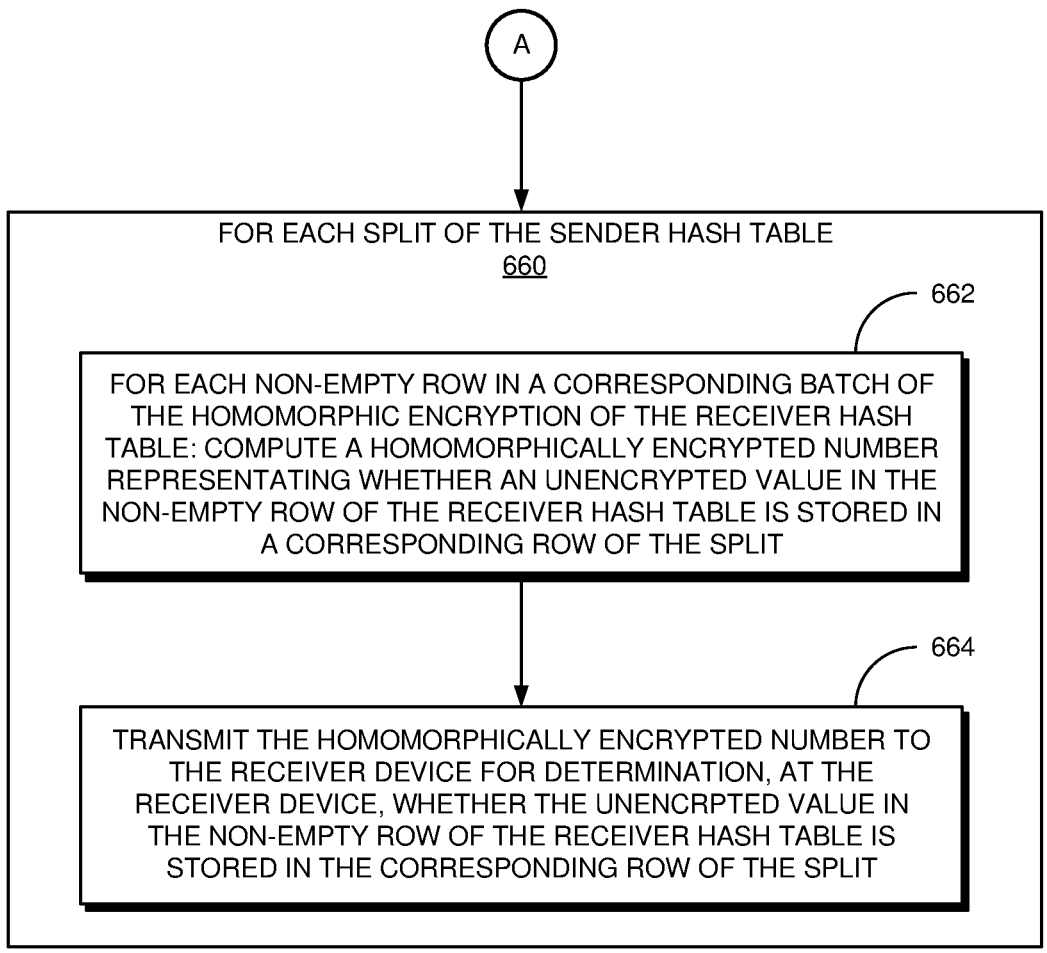

FIG. 6 is a flow chart of an example method 600 for the sender device 120 to facilitate computing a private set intersection, in accordance with some embodiments.

At operation 610, the sender device 120 stores a first set of values Y (e.g. $y_1$, $y_2$, $y_3$, $y_4$, $y_5$, and $y_6$, and the receiver device stores a second set of values X (e.g. $x_1$, $x_2$, and $x_3$).

At operation 620, the sender device 120 computes a sender hash table H(Y) for the first set of values. The receiver device 110 computes a receiver hash table H(X) for the second set of values. The sender hash table and the receiver hash table are constructed using the hash function H. H is an OPRF that is stored at the sender device 120 and obliviously accessible to the receiver device 110. In some cases, H guarantees that there are no hash collisions for the second set of values X. However, there may be hash collisions for the first set of values Y, which may be much larger than X. The receiver device 110 computes a homomorphic encryption of the receiver hash table, which is represented as Enc(H(X)). In some cases, Enc is a homomorphic encryption function that is accessible to the receiver device 110 but not to the sender device 120. Similarly, the decryption function, which is the inverse of Enc, is accessible to the receiver device 110 but not to the sender device 120.

At operation 630, the sender device 120 receives, from the receiver device 110, the homomorphic encryption of the receiver hash table for the second set of values. The receiver hash table lacks hash collisions.

At operation 640, the sender device 120 batches the homomorphic encryption of the receiver hash table and the sender hash table into a plurality of batches. The batches leave the rows intact and each batch is assigned a set of rows.

At operation 650, the sender device 120 splits each batch of the plurality of batches of the sender hash table into a plurality of splits. The splits leave the columns intact and each split is assigned a set of rows.

Operation 660 includes operations 662 and 664. For operation 660, each split is handled individually. In some cases, the sender device 120 has multi-threaded processing hardware. Each split of the sender hash table is processed using a separate and distinct thread of the multi-threaded processing hardware. Alternatively, multiple splits may be processed by a single thread. At operation 662, for each non-empty row in a corresponding batch of the homomorphic encryption of the receiver hash table: the thread computes a homomorphically encrypted number representing whether an unencrypted value in the non-empty row of the receiver hash table is stored in a corresponding row of the split. At operation 664, the thread transmits the homomorphically encrypted number to the receiver device for determination, at the receiver device, whether the unencrypted value in the non-empty row of the receiver hash table is stored in the corresponding row of the split.

Table 7 illustrates some notation used below.

TABLE 7

Notation.

Y is the set of the sender device 120; X is the set of the receiver device 110. In some aspects, it is assumed that |Y| ≫ |X|.
σ is the length of items in X and Y.
l is the length of labels in Labeled PSI.
n is the ring dimension in the fully homomorphic encryption scheme (a power of 2);
q is the ciphertext modulus; t is the plaintext modulus.
d is the degree of the extension field in the Single Instruction Multiple TABLE 7-continued Notation.

Data (SIMD) encoding.
m is the hash table size.
α is the number of partitions we use to split the sender's set Y in the PSI protocol.
[i, j] denotes the set {i, i + 1, . . . , j}, and [j] is shorthand for the case i = 1.

In some cases, to compute the homomorphically encrypted number, the thread computes a set of differences. The set of differences includes differences between a value in the non-empty row of the homomorphic encryption of the receiver hash table and each non-empty value in the corresponding row of the split. The thread computes a product of members of the set of differences. The thread multiplies the product of the members of the set of differences by a random number to compute a first number. The thread adds the first number to the payload function of the encryption of the value in the non-empty row of the homomorphic encryption of the receiver hash table to compute the homomorphically encrypted number. In some cases, the thread carries out all of these calculations modulo a prime number that is greater than a threshold number (e.g. greater than 2^64 or greater than 2^128).

PSI allows two devices, the sender device 120 and the receiver device 110, to compute the intersection of their private sets without revealing extra information to each other. Some aspects are directed to the unbalanced PSI setting, where (1) the set of the receiver device 110 is significantly smaller than the set of the sender device 120, and (2) the receiver device 110 (with the smaller set) is a low-power device. In a Labeled PSI setting, the sender device 120 holds a label per each item in its set, and the receiver device 110 obtains the labels from the items in the intersection. Some aspects add efficient support for arbitrary length items, construct and implement an unbalanced Labeled PSI protocol with small communication complexity, and strengthen the security model using an OPRF in the pre-processing phase. As used herein, the phrase "Labeled PSI" encompasses its plain and ordinary meaning, and may refer to, among other things, a PSI problem space where every element $y_i$ in the set of the sender device 120 is associated with a payload $P(y_i)$.

PSI is a secure computation protocol that allows two devices, the sender device 120 and the receiver device 110, to compute the intersection of their private sets Y and X with pre-determined sizes, such that the receiver device 110 only learns Y∩X from the interaction and the sender device 120 learns nothing. One example use cases is a user of a mobile phone using which of his/her contacts (stored at the mobile phone) are users of a messaging service (where the list of users of the messaging service is stored at a server). One example of a use case is two businesses learning their common customers without either business exposing its customer list.

In some cases, a pre-processing phase can be performed to facilitate a more efficient online phase. The core idea is to first update the values being intersected using an oblivious PRF, where the sender device 120, and not the receiver device 110, knows the key.

One protocol performs noise flooding to prove the security for the sender. The need for this stems from the fact that noise growth in homomorphic operations depends not only on the ciphertexts being operated on, but also on the underlying plaintexts. Thus, their security proof might not work if the result ciphertexts are not re-randomized at the end, and if the underlying noise distribution is not hidden by flooding the noise by an appropriate number of bits.

There are at least two different problems with this approach. First, it requires the sender device 120 to estimate a heuristic upper bound on the size of noise, and ensure that there is enough noise room left to perform an appropriate amount of noise flooding. This makes it impossible to run their protocol with small fully homomorphic encryption (FHE) parameters, even for very small sets. Also, their protocol is fragile against malicious attacks. For example, the receiver can insert more noise into its ciphertexts, causing the sender to noise-flood by fewer bits than it thinks. Now, by examining the noise distribution after the PSI computation, the receiver device 110 can potentially obtain extra information about the set of the sender device 120.

Some aspects take a different approach to solving this problem, removing noise flooding altogether. Namely, some aspects use an OPRF to hash the items on both sides before engaging in the PSI protocol. This ensures that the items in the set of the sender device 120 are pseudo-random in the view of the receiver device 110, preventing the receiver device 110 from learning anything about the original items, even if it learns the hashed values in full.

Abstractly, some aspects have, for the sample of the sender device 120, a key k and instruct the sender device 120 to locally compute $Y'=\{F_k(y)|y \in Y\}$. The receiver device 110 then interactively applies the OPRF to its set, obtaining $X'=\{F_k(x)|x \in X\}$. From a security perspective it is now safe to send Y' to the receiver, who can infer the intersection from Y'∩X'. However, this approach incurs a very high communication overhead, since Y' can easily be over a gigabyte. The communication may be linear in the set |Y|, and compression techniques may introduce false positives.

One approach sidesteps this issue by applying an FHE-based PSI protocol to the sets Y' and X'. Overall, the communication complexity of the protocol is O(|X| log |Y|). As previously described, some aspects do not need to worry about noise flooding, since the OPRF already provides sufficient protection. This allows the protocol to use FHE parameters that are highly optimized, improving the performance and communication overhead.

More broadly, applying the OPRF to the sets also eliminates the need to perform two other procedures which protect the set of the sender device 120. First, recall that the sender device 120 performs simple hashing where its |Y| items are mapped to O(|Y|) bins using three hash functions. In one protocol all of these bins must then be padded with dummy items to an upper bound. This prevents some partial information from being leaked to the receiver, e.g. m items hash to bin i, which implies that |{y∈Y|h(x)=i}|=m. However, in the case that the OPRF is applied, the number of items in any given bin is a function of Y', and therefore can be made public.

Secondly, the polynomials that the sender device 110 evaluates using the set of the receiver device 110 need not be randomized In one approach, the sender evaluates homomorphically a polynomial of the form $F(x)=r\Pi_{y \in Y}(x-y)$, where r←F⁺ is sampled uniformly at random each time the protocol is executed. This additional randomization was used to ensure that the receiver does not learn the product of differences between x and Y. It also has an impact on performance, as it increases the multiplicative depth by one. However, after the OPRF is applied, this polynomial is formed with respect to Y'—not Y—and therefore revealing the product of differences is no longer a security risk, since Y' can securely be made public.

The Diffie-Hellman based OPRF protocol computes the function $F_\alpha(y)=(H'(y)^\alpha)$, where H is a hash function modeled as a random oracle. In more detail, let G be a cyclic group with order q, where the One-More-Gap-Diffie-Hellman (OMGDH) problem is hard. H is a random oracle hash function with range $\mathbb{Z}_q^*$. The sender device 120 has a key $\alpha \in \mathbb{Z}_q^*$ and the receiver has an input $x \in \{0, 1\}^*$. The receiver device 110 first samples $\beta \leftarrow \mathbb{Z}_q^*$ and sends $H(x)^\beta$ to the sender device 120, which responds with $(H(x)\beta)^\alpha$. The receiver device 110 can then output $H'(H(x)^\alpha)=H'(((H(x)^\beta)^\alpha)^{1/\beta})$. The outer hash function H' is used to map the group element to a sufficiently long bit string, and helps facilitate extraction in the malicious setting.

In particular, by observing the queries made to $H(x_i)$, the simulator can collect a list of pairs $\{(x_i, H(x_i))\}$ which are known to the receiver device 110. From this set the simulator can compute the set $A=\{(x_i, H(x_i)^\alpha)\}$. For some subset of the $H(x_i)$, the receiver device 110 sends $\{H(x_i)^{\beta_i}\}$ to the simulator, who sends back $\{H(x_i)^{\beta_i \alpha}\}$. For the receiver device 110 to learn the OPRF value for $x_i$, it must send $H(x_i)^\alpha$ to the random oracle H'. At this time the simulator extracts $x_i$ if $(x_i, H(x_i)^\alpha) \in A$. Although this OPRF does not facilitate extracting all $x_i$ at the time the first message is sent, extraction is performed before the receiver device 110 learns the OPRF value.

In the context of the PSI protocol, this OPRF has the property that the sender device 120 can use the same key with multiple different receiver devices 110. This allows the sender device 120, which has a large and often relatively static set, to pre-process its set only once. This is particularly valuable since the protocol also allows for efficient insertions and deletions of data from the pre-processed set.

If the parties perform the OPRF pre-processing phase, this procedure can be significantly improved. The core idea is to first encrypt all of the labels using the associated OPRF values as the key. All of these encrypted labels can then be sent to the receiver device 110, which uses the OPRF values for the items in its set to decrypt the associated labels. This approach makes no security guarantees from the homomorphic encryption scheme to ensure that information is not leaked to the receiver about labels for items not in the intersection.

To avoid linear communication when sending these encrypted labels, in some aspects, the sender device 120 evaluates a polynomial which interpolates the encrypted labels, effectively compressing the amount of data that needs to be communicated. In more detail, the sender device 120 first computes $(y_i', y_i'')=\text{OPRF}_k(y_i)$ for all $y_i$ in its set Y. Here, $y_i'$ will be used as the OPRF value for computing the intersection as before, while the second part $y_i''$ will be used to one-time-pad encrypt the label as $l_i'=l_i+y_i''$. The sender device 120 then computes a polynomial G with minimal degree such that $G(y_i')=l_i'$.

One advantage of this approach is that the degree of the online computation is reduced due to G not requiring additional randomization. Recall from above that the result of evaluating the symmetric polynomial F may be randomized by multiplying with a nonzero r. This increases the degree of the computation by one, which may require larger FHE parameters.

The approach for improved security against a malicious sender device 120 uses Labeled PSI, but does not require the evaluated symmetric polynomial F(x) to be sent back to the receiver device 110. As such, by not requiring F in the computation of the labels, some aspects gain an addition performance improvement in the malicious setting by not computing or evaluating F.

In summary, some aspects of the technology described herein are directed to techniques for computing a private set intersection are disclosed. The sender device 120 stores a first set of values. The sender device 120 receives, from a receiver device 110, a homomorphic encryption of a receiver device value. The sender device 120 computes a homomorphically encrypted number based on a difference between the homomorphic encryption of the receiver device value and each value in the first set of values, and based on a hash function of the encryption of the receiver device value. The sender device 120 transmits the homomorphically encrypted number to the receiver device 110 for determination, at the receiver device 110, whether the receiver device value is in the first set of values.

Numbered Examples

Certain embodiments are described herein as numbered examples 1, 2, 3, etc. These numbered examples are provided as examples only and do not limit the subject technology.

Example 1 is a system comprising: processing hardware of a sender device; and a memory of the sender device, the memory storing instructions which, upon execution by the processing hardware, cause the processing hardware to perform operations comprising: storing, in the memory of the sender device, a first set of values; receiving, from a receiver device, a homomorphic encryption of a receiver device value; computing a homomorphically encrypted number based on a difference between the homomorphic encryption of the receiver device value and each value in the first set of values, and based on a payload function of the encryption of the receiver device value; and transmitting the homomorphically encrypted number to the receiver device for determination, at the receiver device, whether the receiver device value is in the first set of values.

In Example 2, the subject matter of Example 1 includes, wherein computing the homomorphically encrypted number comprises: computing a set of differences, the set of differences comprising differences between the homomorphic encryption of the receiver device value and each value in the first set of values; computing a product of members of the set of differences; multiplying the product of the members of the set of differences by a random number to compute a first number; and adding the first number to the payload function of the encryption of the receiver device value to compute the homomorphically encrypted number.

In Example 3, the subject matter of Examples 1-2 includes, wherein the receiver device performs operations comprising: decrypting the homomorphically encrypted number to compute a decrypted number; and determining whether the receiver device value is in the first set of values based on whether the decrypted number is equal to the payload function of the receiver device value, wherein the receiver device value is not encrypted.

In Example 4, the subject matter of Examples 1-3 includes, wherein the homomorphic encryption is computed using a homomorphic encryption function, wherein the homomorphic encryption function is not accessible to the sender device, and wherein the homomorphic encryption function is accessible to the receiver device.

In Example 5, the subject matter of Example 4 includes, wherein an inverse of the homomorphic encryption function is not accessible to the sender device, and wherein the inverse of the homomorphic encryption function is accessible to the receiver device.

In Example 6, the subject matter of Examples 1-5 includes, the operations further comprising: storing, in the memory of the sender device, a payload for each value in the first set of values, the payload for a given value being equal to the payload function of the given value.

In Example 7, the subject matter of Examples 1-6 includes, wherein the payload function is an oblivious pseudorandom function (OPRF) that is stored at the sender device and obliviously accessible to the receiver device.

In Example 8, the subject matter of Examples 1-7 includes, wherein computing the homomorphically encrypted number is done modulo a prime number that is greater than a threshold number.

In Example 9, the subject matter of Examples 1-8 includes, wherein the sender device is a server, and wherein the receiver device is a client device.

Example 10 is a method implemented at a receiver device, the method comprising: computing a homomorphic encryption of a receiver device value stored at the receiver device; transmitting, to a sender device, the homomorphic encryption of the receiver device value; receiving, from the sender device, a homomorphically encrypted number in response to the homomorphic encryption of the receiver device value; decrypting the homomorphically encrypted number to compute a decrypted number; and determining whether the receiver device value is in a first set of values stored at the sender device based on whether the decrypted number is equal to a payload function of the receiver device value.

In Example 11, the subject matter of Example 10 includes, wherein the homomorphically encrypted number is computed at the sender device based on the homomorphic encryption of the receiver device value.

In Example 12, the subject matter of Examples 10-11 includes, wherein the homomorphic encryption is computed using a homomorphic encryption function, wherein the homomorphic encryption function is not accessible to the sender device, and wherein the homomorphic encryption function is accessible to the receiver device.

In Example 13, the subject matter of Examples 11-12 includes, wherein an inverse of the homomorphic encryption function is not accessible to the sender device, and wherein the inverse of the homomorphic encryption function is accessible to the receiver device.

In Example 14, the subject matter of Examples 10-13 includes, wherein the payload function is an oblivious pseudorandom function (OPRF) that is stored at the sender device and obliviously accessible to the receiver device.

In Example 15, the subject matter of Examples 10-14 includes, wherein the sender device is a server, and wherein the receiver device is a client device.

In Example 16, the subject matter of Examples 10-15 includes, wherein the sender device stores a payload associated with each member of the first set of values, and wherein the payload associated with a given member is equal to the payload function of the member.

In Example 17, the subject matter of Examples 10-16 includes, wherein the homomorphic encryption of the receiver device value and the payload function of the receiver device value are computed modulo a prime number that is greater than a threshold number.

Example 18 is a non-transitory machine-readable medium storing instructions which, upon execution by a sender device, cause the sender device to perform operations comprising: storing, at the sender device, a first set of values; computing, at the sender device, a sender hash table for the first set of values; receiving, from a receiver device, a homomorphic encryption of a receiver hash table for a second set of values, the receiver hash table lacking hash collisions, and the second set of values being stored at the receiver device; batching the homomorphic encryption of the receiver hash table and the sender hash table into a plurality of batches; splitting each batch of the plurality of batches of the sender hash table into a plurality of splits; and for each split of the sender hash table: for each non-empty row in a corresponding batch of the homomorphic encryption of the receiver hash table: computing a homomorphically encrypted number representing whether an unencrypted value in the non-empty row of the receiver hash table is stored in a corresponding row of the split; and transmitting the homomorphically encrypted number to the receiver device for determination, at the receiver device, whether the unencrypted value in the non-empty row of the receiver hash table is stored in the corresponding row of the split.

In Example 19, the subject matter of Example 18 includes, wherein the sender device comprises multi-threaded processing hardware, and wherein each split of the sender hash table is processed using a separate and distinct thread of the multi-threaded processing hardware.

In Example 20, the subject matter of Examples 18-19 includes, wherein computing the homomorphically encrypted number comprises: computing a set of differences, the set of differences comprising differences between a value in the non-empty row of the homomorphic encryption of the receiver hash table and each non-empty value in the corresponding row of the split; computing a product of members of the set of differences; multiplying the product of the members of the set of differences by a random number to compute a first number; and adding the first number to the payload function of the encryption of the value in the non-empty row of the homomorphic encryption of the receiver hash table to compute the homomorphically encrypted number.

In Example 21, the subject matter of Example 20 includes, wherein computing the set of differences, computing the product of the members, multiplying the product of the members by the random number, and adding the first number to the payload function of the encryption of the value in the non-empty row of the homomorphic encryption of the receiver hash table are all done modulo a prime number that is greater than a threshold number.

In Example 22, the subject matter of Examples 18-21 includes, wherein the sender hash table and the receiver hash table are constructed using a hash function, and wherein the hash function is an oblivious pseudorandom function (OPRF) that is stored at the sender device and obliviously accessible to the receiver device.

In Example 23, the subject matter of Example 22 includes, wherein the hash function guarantees that there are no hash collisions for the second set of values.

In Example 24, the subject matter of Examples 18-23 includes, wherein the homomorphic encryption is computed using a homomorphic encryption function, wherein the homomorphic encryption function is not accessible to the sender device, and wherein the homomorphic encryption function is accessible to the receiver device.

In Example 25, the subject matter of Example 24 includes, wherein an inverse of the homomorphic encryption function is not accessible to the sender device, and wherein the inverse of the homomorphic encryption function is accessible to the receiver device.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components might not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 7:
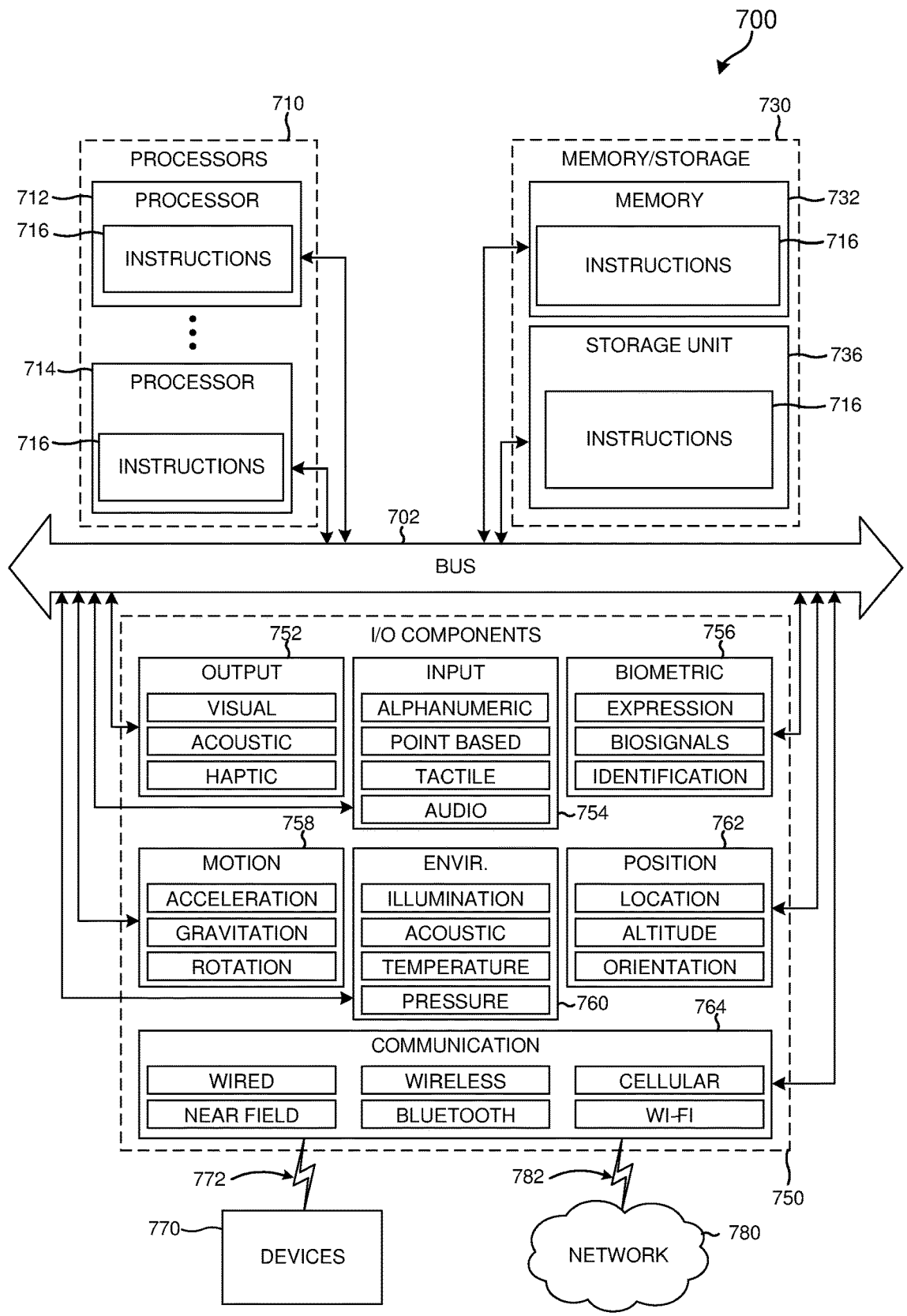
FIG. 7 is a block diagram illustrating components of a machine able to read instructions from a machine-readable medium and perform any of the methodologies discussed herein, in accordance with some embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components, or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

What is claimed is:

1. A system comprising:
   processing hardware of a sender device; and
   a memory of the sender device, the memory storing instructions which, upon execution by the processing hardware, cause the processing hardware to perform operations comprising:
      storing, in the memory of the sender device, a first set of values;
      computing a sender hash table for the first set of values;
      receiving, from a receiver device, a homomorphic encryption of a receiver hash table for a second set of values, the receiver hash table including no repeat values, and the second set of values including fewer values than the first set of values;
      batching the homomorphic encryption of the receiver hash table and the sender hash table into a plurality of batches by separating the homomorphic encryption of the receiver hash table and the sender hash table into multiple tables of a same number of rows to generate batched receiver hash tables and batched sender hash tables such that an entry in the receiver hash table appears in only one of the batched receiver hash tables and an entry in the sender hash table appears in only one of the batched sender hash tables;
      splitting each batch of the plurality of batches of the sender hash table into a plurality of splits by separating the batched sender hash tables into multiple tables of a same number of columns to generate split batched sender hash tables such that an entry in the sender hash table appears in only one of the split batched sender hash tables; and for each split batched sender hash table of the split batched sender hash tables:

for each non-empty row in a corresponding batched receiver hash table of the batched receiver hash tables: computing a homomorphically encrypted number representing whether an unencrypted value in the non-empty row of the receiver hash table is stored in a corresponding row of a split batched sender hash table of the split batched sender hash tables; and transmitting the homomorphically encrypted number to the receiver device for determination, at the receiver device, whether the unencrypted value in the non-empty row of the receiver hash table is stored in the corresponding row of the split.

2. The system of claim 1, wherein computing the homomorphically encrypted number comprises:

computing a set of differences, the set of differences comprising differences between the homomorphic encryption of the receiver device value and each value in the first set of values;

computing a product of members of the set of differences;

multiplying the product of the members of the set of differences by a random number to compute a first number; and adding the first number to a payload function of the encryption of the receiver device value to compute the homomorphically encrypted number.

3. The system of claim 1, wherein the receiver device performs operations comprising:

decrypting the homomorphically encrypted number to compute a decrypted number; and determining whether the receiver device value is in the first set of values based on whether the decrypted number is equal to the payload function of the receiver device value, wherein the receiver device value is not encrypted.

4. The system of claim 1, wherein the homomorphic encryption is computed using a homomorphic encryption function, wherein the homomorphic encryption function is not accessible to the sender device, and wherein the homomorphic encryption function is accessible to the receiver device.

5. The system of claim 4, wherein an inverse of the homomorphic encryption function is not accessible to the sender device, and wherein the inverse of the homomorphic encryption function is accessible to the receiver device.

6. The system of claim 1, the operations further comprising:

storing, in the memory of the sender device, a payload for each value in the first set of values, the payload for a given value being equal to the payload function of the given value.

7. The system of claim 6, wherein the payload function is an oblivious pseudorandom function (OPRF) that is stored at the sender device and obliviously accessible to the receiver device.

8. The system of claim 1, wherein computing the homomorphically encrypted number is done modulo a prime number that is greater than a threshold number.

9. The system of claim 1, the operations further comprising:

transmitting, to the receiver device, a payload of the homomorphically encrypted number together with the homomorphically encrypted number.

10. A method implemented at a device, the method comprising:

computing, at a sender device, a sender hash table for the first set of values;

receiving, from a receiver device, a homomorphic encryption of a receiver hash table for a second set of values, the receiver hash table including no repeat values, and the second set of values being stored at the receiver device and including fewer values than the first set of values;

batching the homomorphic encryption of the receiver hash table and the sender hash table into a plurality of batches by separating the homomorphic encryption of the receiver hash table and the sender hash table into multiple tables of a same number of rows to generate batched receiver hash tables and batched sender hash tables such that an entry in the receiver hash table appears in only one of the batched receiver hash tables and an entry in the sender hash table appears in only one of the batched sender hash tables;

splitting each batch of the plurality of batches of the sender hash table into a plurality of splits by separating the batched sender hash tables into multiple tables of a same number of columns to generate split batched sender hash tables such that an entry in the sender hash table appears in only one of the split batched sender hash tables; and for each split batched sender hash table of the split batched sender hash tables:

for each non-empty row in a corresponding batched receiver hash table of the batched receiver hash tables: computing a homomorphically encrypted number representing whether an unencrypted value in the non-empty row of the receiver hash table is stored in a corresponding row of a split batched sender hash table of the split batched sender hash tables; and transmitting the homomorphically encrypted number to the receiver device for determination, at the receiver device, whether the unencrypted value in the non-empty row of the receiver hash table is stored in the corresponding row of the split.

11. The method of claim 10, wherein the homomorphically encrypted number is computed at the sender device based on the homomorphic encryption of the receiver device value.

12. The method of claim 10, wherein the homomorphic encryption is computed using a homomorphic encryption function, wherein the homomorphic encryption function is not accessible to the sender device, and wherein the homomorphic encryption function is accessible to the receiver device.

13. The method of claim 11, wherein an inverse of the homomorphic encryption function is not accessible to the sender device, and wherein the inverse of the homomorphic encryption function is accessible to the receiver device.

14. The method of claim 10, wherein a payload function is an oblivious pseudorandom function (OPRF) that is stored at the sender device and obliviously accessible to the receiver device.

15. The method of claim 10, wherein the sender device is a server, and wherein the receiver device is a client device.

16. The method of claim 14, wherein the sender device stores the payload associated with each member of the first set of values, and wherein the payload associated with a given member is equal to the payload function of the member.

17. The method of claim 14, wherein the homomorphic encryption of the receiver device value and the payload function of the receiver device value are computed modulo a prime number that is greater than a threshold number.

18. A non-transitory machine-readable medium storing instructions which, upon execution by a sender device, cause the sender device to perform operations comprising:
  storing, at the sender device, a first set of values;
  computing, at the sender device, a sender hash table for the first set of values;
  receiving, from a receiver device, a homomorphic encryption of a receiver hash table for a second set of values, the receiver hash table including no repeat values, and the second set of values being stored at the receiver device and including fewer values than the first set of values;
  batching the homomorphic encryption of the receiver hash table and the sender hash table into a plurality of batches by separating the homomorphic encryption of the receiver hash table and the sender hash table into multiple tables of a same number of rows to generate hatched receiver hash tables and batched sender hash tables such that an entry in the receiver hash table appears in only one of the batched receiver hash tables and an entry in the sender hash table appears in only one of the batched sender hash tables;
  splitting each batch of the plurality of batches of the sender hash table into a plurality of splits by separating the batched sender hash tables into multiple tables of a same number of columns to generate split batched sender hash tables such that an entry in the sender hash table appears in only one of the split batched sender hash tables; and
  for each split batched sender hash table of the split batched sender hash tables:
    for each non-empty row in a corresponding batched receiver hash table of the batched receiver hash tables: computing a homomorphically encrypted number representing whether an unencrypted value in the non-empty row of the receiver hash table is stored in a corresponding row of a split batched sender hash table of the split batched sender hash tables; and
    transmitting the homomorphically encrypted number to the receiver device for determination; at the receiver device, whether the unencrypted value in the non-empty row of the receiver hash table is stored in the corresponding row of the split.

19. The machine-readable medium of claim 18, wherein the sender device comprises multi-threaded processing hardware, and wherein each split of the sender hash table is processed using a separate and distinct thread of the multi-threaded processing hardware.

20. The machine-readable medium of claim 18, wherein computing the homomorphically encrypted number comprises:
  computing a set of differences, the set of differences comprising differences between a value in the non-empty row of the homomorphic encryption of the receiver hash table and each non-empty value in the corresponding row of the split;
  computing a product of members of the set of differences;
  multiplying the product of the members of the set of differences by a random number to compute a first number; and
  adding the first number to a payload function of the encryption of the value in the non-empty row of the homomorphic encryption of the receiver hash table to compute the homomorphically encrypted number.

21. The machine-readable medium of claim 20, wherein computing the set of differences, computing the product of the members, multiplying the product of the members by the random number, and adding the first number to the payload function of the encryption of the value in the non-empty row of the homomorphic encryption of the receiver hash table are all done modulo a prime number that is greater than a threshold number.

22. The machine-readable medium of claim 18, wherein the sender hash table and the receiver hash table are constructed using a hash function, and wherein the hash function is an oblivious pseudorandom function (OPRF) that is stored at the sender device and obliviously accessible to the receiver device.

23. The machine-readable medium of claim 22, wherein the hash function guarantees that there are no hash collisions for the second set of values.

24. The machine-readable medium of claim 18, wherein the homomorphic encryption is computed using a homomorphic encryption function, wherein the homomorphic encryption function is not accessible to the sender device, and wherein the homomorphic encryption function is accessible to the receiver device.

25. The machine-readable medium of claim 24, wherein an inverse of the homomorphic encryption function is not accessible to the sender device, and wherein the inverse of the homomorphic encryption function is accessible to the receiver device.

* * * * *